United States Patent
Negishi

(10) Patent No.: US 7,784,939 B2
(45) Date of Patent: Aug. 31, 2010

(54) POLARIZING LENS FOR SUNGLASSES AND METHOD OF SHAPING THE SAME

(75) Inventor: Norihiro Negishi, Chiba (JP)

(73) Assignee: Ohkei Optical Co., Ltd., Chiba (JP)

( * ) Notice: Subject to any disclaimer, the term of this patent is extended or adjusted under 35 U.S.C. 154(b) by 206 days.

(21) Appl. No.: 12/082,912

(22) Filed: Apr. 15, 2008

(65) Prior Publication Data
US 2009/0257021 A1    Oct. 15, 2009

(51) Int. Cl.
G02C 7/10 (2006.01)
G02C 7/12 (2006.01)
G02C 7/02 (2006.01)

(52) U.S. Cl. .............. 351/163; 351/44; 351/49; 351/177

(58) Field of Classification Search ......... 351/163–165, 351/44, 49
See application file for complete search history.

(56) References Cited

U.S. PATENT DOCUMENTS

| | | | | |
|---|---|---|---|---|
| 7,042,641 B2 * | 5/2006 | Gettens | ............... | 359/490 |
| 7,407,280 B2 * | 8/2008 | Posin et al. | ............... | 351/44 |
| 2006/0028613 A1 * | 2/2006 | Yasuda | ............... | 351/159 |

FOREIGN PATENT DOCUMENTS

| | | |
|---|---|---|
| JP | 2000-171761 | 6/2000 |
| JP | 2006-047586 | 2/2006 |
| JP | 2008-026652 | 2/2008 |

* cited by examiner

*Primary Examiner*—Jordan M. Schwartz
(74) *Attorney, Agent, or Firm*—Flynn, Thiel, Boutell & Tanis, P.C.

(57) ABSTRACT

There is provided a polarizing lens for sunglasses capable of effectively preventing light from falling on eyes outside the lens at the side of the eyes in the polarizing lens for sunglasses of spherical shape. The polarizing lens for sunglasses is made up of a polarizing lens object for sunglasses formed by pasting a lens element for an object and a lens element for an eyepiece to an object plane and an eyepiece plane of a polarizing film having a polarizing axis oriented horizontally, respectively, the polarizing lens object for sunglasses having a spherical surface with a spherical radius that is determined from a standard human head part, and a portion extending from a first curved position at the side of the eyes of the polarizing lens object for sunglasses to a terminal end thereof forming a first rotating surface, the first rotating surface being formed of a part of a rotating surface obtained by rotating a vertical section of the spherical surface at the first curved position provided that a vertical rotating axis passing through a radius line of a spherical radius on a plane at the first curved position and a radius of first rotating body that is smaller than the spherical radius are rotating conditions.

4 Claims, 3 Drawing Sheets

POLARIZING LENS FOR SUNGLASSES AND METHOD OF SHAPING THE SAME

FIELD OF THE INVENTION

The invention relates to a polarizing lens for sunglasses, particularly to a spherical shape of the polarizing lens for sunglasses and a method of shaping the same.

BACKGROUND OF THE INVENTION

Polarization sunglasses having been mostly used for fishing, driving an automobile, piloting an airplane, and so forth besides an everyday use in view of an incidence direction of light and restriction of quantity of light owing to a polarizing function of light. The latest polarizing lens for sunglasses approach the eyes and have a spherical shape fitting along people's face in order to prevent light from falling on eyes outside the lens as shown in the cited document 1, etc. Although it is easy to manufacture a single spherical shaped lens, the single spherical lens cannot effectively prevent light from falling on eyes outside the lens at the side of a wearer's eyes when wearing the polarizing lens as sunglasses.

Patent documents 1 JP 2000-171761A

Patent documents 2 JP 2006-47586A

SUMMARY OF THE INVENTION

Therefore, it is an object of the invention to provide a polarizing lens for sunglasses capable of effectively preventing light from falling on eyes outside the lens at the side of the eyes in the polarizing lens for sunglasses having a spherical shape.

MEANS FOR SOLVING THE PROBLEM

To that end, the invention is intended to effectively prevent light from falling on eyes outside the lens at the side of the eyes by forming a polarizing lens object 2 for sunglasses for two eyes or one eye as a perfect spherical body, and curving a spherical surface at the side of the eyes along with one or two rotating bodies.

In particular, a polarizing lens 1 for sunglasses according to a first aspect of the invention comprises a polarizing lens object 2 for sunglasses formed by pasting a lens element 5 for an object and a lens element 6 for an eyepiece to an object plane and an eyepiece plane of a polarizing film 4 having a polarizing axis 3 oriented horizontally, respectively, said polarizing lens object 2 for sunglasses having a shaped spherical surface 7 having a spherical radius R0 that is determined from a standard human head part, and a portion extending from a first curving position P1 at the side of the eyes of the polarizing lens object 2 for sunglasses to a terminal end thereof forming a first rotating surface 11, said first rotating surface 11 being formed of a part of a rotating surface obtained by rotating a vertical section of the spherical surface 7 at the first curving position P1 provided that a vertical rotating axis 8 passing through a radius line of a spherical radius R0 on a plane at the first curving position P1 and a radius R1 of first rotating body that is smaller than the spherical radius R0 are rotating conditions.

A polarizing lens 1 for sunglasses according to a second aspect of the invention comprises a polarizing lens object 2 for sunglasses formed by pasting a lens element 5 for an object and a lens element 6 for an eyepiece to an object plane and an eyepiece plane of a polarizing film 4 having a polarizing axis 3 oriented horizontally, respectively, said polarizing lens object 2 for sunglasses having a spherical surface 7 with a spherical radius R0 that is determined from a standard human head part, and a portion extending from a first curved position P1 at the side of the eyes of the polarizing lens object 2 for sunglasses to a second curved position P2 at a terminal end side of the polarizing lens object 2 for sunglasses forming a first rotating surface 11, said first rotating surface 11 being formed of a part of a rotating surface obtained by rotating a vertical section of the spherical surface 7 at the first curved position P1 provided that a vertical rotating axis 8 passing through a radius line of the spherical radius R0 on a plane at the first curved position P1 and a radius R1 of the first rotating body that is smaller than the spherical radius R0 are rotating conditions, and a portion extending from the second curved position P2 at the side of the eyes of the polarizing lens object 2 for sunglasses to the terminal end thereof forming a second rotating surface 12, said second rotating surface 12 being formed of a part of a rotating surface obtained by rotating a vertical section of the first rotating surface 11 at the second curved position P2 provided that a vertical rotating axis 9 passing through an extension line of a radius line of the radius R1 of a first rotating body on a plane at the second curved position P2 and a radius R2 of a second rotating body that is larger than the radius R1 of the first rotating body but smaller than the spherical radius R0 are rotating conditions.

According to the polarizing lens for sunglasses in the first or second aspect of the invention, the polarizing lens object 2 for sunglasses may be formed of a single piece that is common to two eyes or an independent piece for each eye.

A method of shaping a first polarizing lens for sunglasses according to a third aspect of the invention comprises the steps of placing a flat plate-shaped polarizing lens object 2 for sunglasses on an inner portion of a mold 16 corresponding thereto, moving a center press die 20, that inscribes in a spherical surface 7 of the polarizing lens object 2 for sunglasses in a segment between left and right first curved positions P1, toward the inner portion of the mold 16 while heating the polarizing lens object 2 for sunglasses, causing the center press die 20 to be put on an eyepiece plane side of the polarizing lens object 2 for sunglasses, for causing the polarizing lens object 2 for sunglasses to be interposed between the inner surface of the mold 16 and the center press die 20, thereby forming a spherical surface on the polarizing lens object 2 for sunglasses; subsequently moving two side press dies 21 that inscribes in left and right first rotating surfaces 11, each extending from the first curved position P1 to the terminal end of the polarizing lens object 2 for sunglasses, toward the inner portion of the mold 16 at the position directing toward the center of the mold 16, then moving two side press dies 21 in a direction to press against the eyepiece plane sides of the first rotating surfaces 11 positioned at left and right sides of the mold 16, causing the polarizing lens object 2 for sunglasses to be interposed between the mold 16 and two side press dies 21 so as to form the left and right first rotating surfaces 11 on the polarizing lens object 2 for sunglasses, thereby shaping the polarizing lens 1 for sunglasses.

A method of shaping a second polarizing lens for sunglasses according to a fourth aspect of the invention comprises the steps of placing a flat plate-shaped polarizing lens object 2 for sunglasses on an inner portion of a mold 17 corresponding thereto, moving a center press die 20, that inscribes in a spherical surface 7 of the polarizing lens object 2 for sunglasses in a segment between left and right first curved positions P1, toward the inner portion of the mold 17 while heating the polarizing lens object 2 for sunglasses, causing the center press die 20 to be put on an eyepiece plane side of the polarizing lens object 2 for sunglasses, for causing the polarizing lens object 2 for sunglasses to be interposed between the inner surface of the mold 17 and the center press die 20, thereby forming a spherical surface on the polarizing lens object 2 for sunglasses; subsequently moving two side press dies 21 that inscribe in left and right first and second rotating surfaces 11, 12, each extending from the first curved position P1 to the terminal end of the polarizing lens object 2 for sunglasses, toward the inner portion of the mold 17, at the position directing toward the center of the mold 17, then moving two side press dies 21 in a direction to be pressed against eyepiece plane sides of the first and second rotating surfaces 11, 12 positioned at left and right sides of the mold 17, causing the polarizing lens object 2 for sunglasses to be interposed between the mold 17 and two side press dies 21, thereby forming the left and right first rotating surfaces 11, 12 on the polarizing lens object 2 for sunglasses, thereby shaping the polarizing lens 1 for sunglasses.

According to the first aspect of the invention, since the polarizing lens for sunglasses at the side of the eyes is curved and extensible to a required length, it is possible to effectively prevent light from falling on eyes outside the lens at the side of the eyes from outside the lens, and a field of view can be widened. Further, since the polarizing lens for sunglasses forms the same spherical shape, even in the vertical section, at all the positions, a wearer can easily see an object and not get tired. Since a lens plane at the object side has the same spherical surface all in a vertical direction, the polarizing lens for sunglasses can be made with a comfortable lens surface when seen from outside. Particularly, since the first rotating surface inscribes in the spherical surface at the first curved position, the first rotating surface and the spherical surface can be smoothly connected to each other on a plane.

According to the second aspect of the invention, in addition to the effect of the first aspect of the invention, since the polarizing lens for sunglasses can be curved inside strongly by two rotating surfaces at the side of the eyes, it can be mounted on a frame having a shape well adapted to a person's face. Further, since the first rotating surface inscribes in the spherical surface at the first curved position, the first rotating surface and the spherical surface can be smoothly connected to each other on a plane. Still further, since the second rotating surface inscribes in the first rotating surface at the second curving position, the first rotating surface and the second rotating surface can be smoothly connected to each other on a plane.

Since the polarizing lens for sunglasses can be made up for two eyes or one eye by cutting the polarizing lens object 2 for sunglasses, it can flexibly cope with a configuration of the frame of sunglasses.

According to the method of shaping the polarizing lens for sunglasses of the invention, a split type die comprising one center press die and two side press dies is used, wherein the center press die is lowered along the center line of the polarization lens object 2 for sunglasses so as to press against the eyepiece plane side of the spherical surface and two side press dies are lowered at the portions directed toward the center of the mold so as to be moved in a direction to press against the first rotating surface and/or second rotating surface, causing the side press dies to press against the eyepiece plane side of the first rotating surface and/or second rotating surface. When the split type die is moved with a time lag, even if an opening of the split type die is narrowed, these dies function effectively while entering the narrowed opening.

BEST MODE FOR CARRYING OUT THE INVENTION

Figure 1:
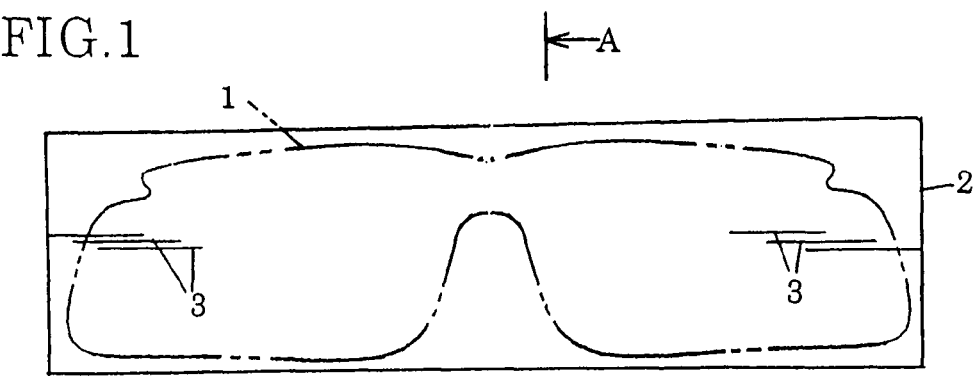
FIG. 1 is a front view of a polarizing lens object 2 for sunglasses.
Figure 2:
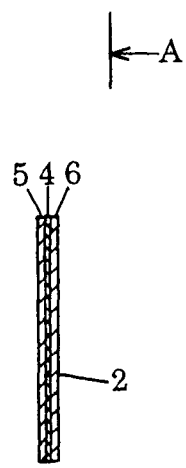
FIG. 2 is a sectional view of the polarizing lens object 2 for sunglasses taken along arrows A-A in FIG. 1.

FIG. 1 and FIG. 2 each show a configuration of a polarizing lens object 2 for sunglasses when manufacturing a polarizing lens 1 for sunglasses for two eyes as an example. The polarizing lens object 2 for sunglasses is made up in a flat plate shape by pasting together a lens element for an object 5, e.g. a polycarbonate, and a lens element for an eyepiece, e.g. a polycarbonate, 6 for an eyepiece to the object plane and an eyepiece plane of a polarizing film 4 having a polarizing axis 3 oriented horizontally with a transparent adhesive, respectively.

In the case where the polarizing lens 1 for sunglasses is used for two eyes, as shown in FIG. 1, the polarizing lens object 2 for sunglasses is long in the direction of the horizontal polarizing axis 3, and has a length to the extent that it covers a face of a wearer. On the other hand, in the case where the polarizing lens 1 for sunglasses is used for 1 eye, the polarizing lens object 2 for sunglasses is made up to have a size to the extent that it covers the circumference of one eye in the direction of the horizontal polarizing axis 3, or has a size to the extent that it can take two or more polarizing lenses 1 for sunglasses for one eye. For the sake of convenience, explained hereinafter is a case of the polarizing lens 1 for sunglasses for two eyes.

In the next cutting (punching) process, the flat plate-shaped polarizing lens object 2 for sunglasses is cut as a predetermined contour as shown in FIG. 1 depending on the configuration of a frame on which the polarizing lens object 2 for sunglasses is mounted. Then, the polarizing lens object 2 for sunglasses after cutting is worked to be curved in a spherical surface in a spherical surface shaping process.

Figure 3:
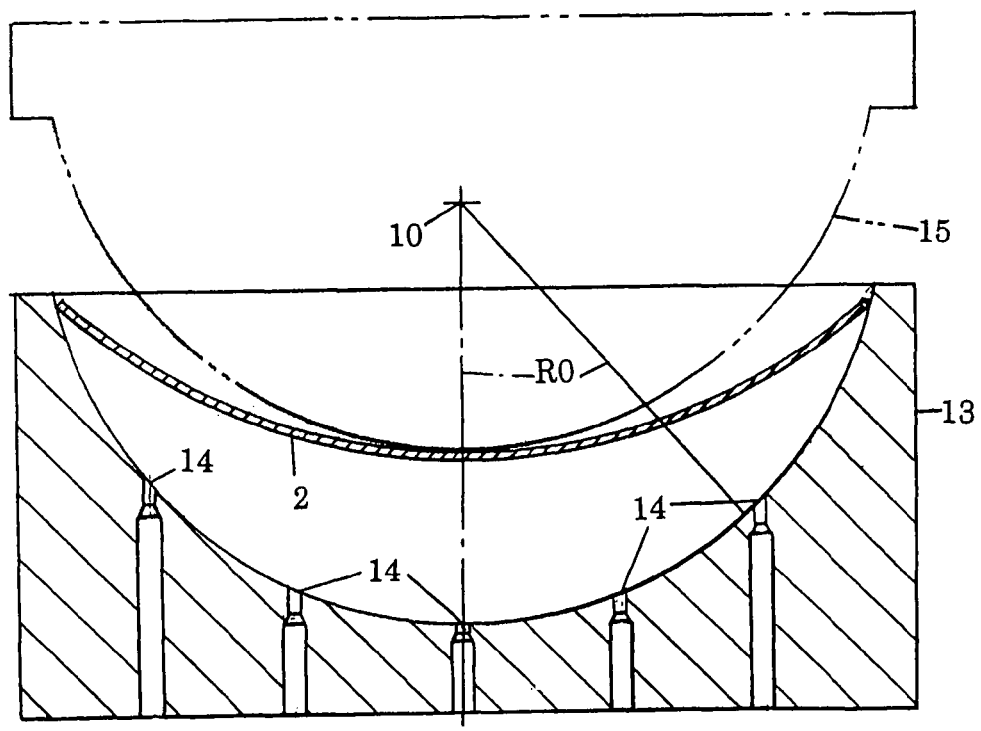
FIG. 3 is a sectional view showing a state where the polarization lens object 2 for sunglasses is subjected to a spherical surface shaping process.

FIG. 3 shows an example of a lower mold 13 used in the spherical surface shaping process to be implemented in its early stage. The polarizing lens object 2 for sunglasses after cutting is shaped as a spherical surface 7 having a spherical radius R0 determined from a standard human head part. For brevity, the spherical radius R0 ranges from the object plane to the center 10 of the sphere, for example, it is assumed to be 88.3 mm. For this reason, the concave spherical surface of the lower mold 13 has the spherical radius R0. The spherical radius ranging from the eyepiece plane to the center 10 of the sphere has a value obtained by subtracting the thickness of the polarizing lens object 2 for sunglasses from the spherical radius R0.

The shaping of the spherical surface 7 is implemented, as shown in FIG. 3, by putting the polarizing lens object 2 for sunglasses after cutting on the concave spherical surface of the lower mold 13, then implementing vacuum suction through multiple suction holes 14 of the lower mold 13 while heating the polarizing lens object 2 for sunglasses, thereby subjecting the polarizing lens object 2 for sunglasses to thermal deformation so that the polarizing lens object 2 for sunglasses is sucked toward the concave spherical surface of the lower mold 13. According to need, the shaping is implemented by interposing the polarizing lens object 2 for sunglasses between the concave spherical surface of the lower mold 13 and an upper convex mold 15 that is fitted in the lower mold 13 while forcibly deforming the polarizing lens object 2 for sunglasses. According to the interposing type shaping made by the concave spherical surface of the lower mold 13 and convex spherical surface of the upper mold 15, the time needed for shaping can be reduced compared with the suction type shaping alone.

The concave spherical surface of the lower mold 13 is a perfect spherical surface and has a spherical radius of the spherical radius R0, as set forth above. Further, the convex spherical surface of the upper mold 15 is also a perfect spherical surface and has a spherical radius obtained by subtracting the thickness of the polarization lens object 2 for sunglasses from the spherical radius R0. The spherical surface shaping process in its early stage can be also implemented in a subsequent shaping process, so that it can be dispensed with, if need be.

Figure 7:
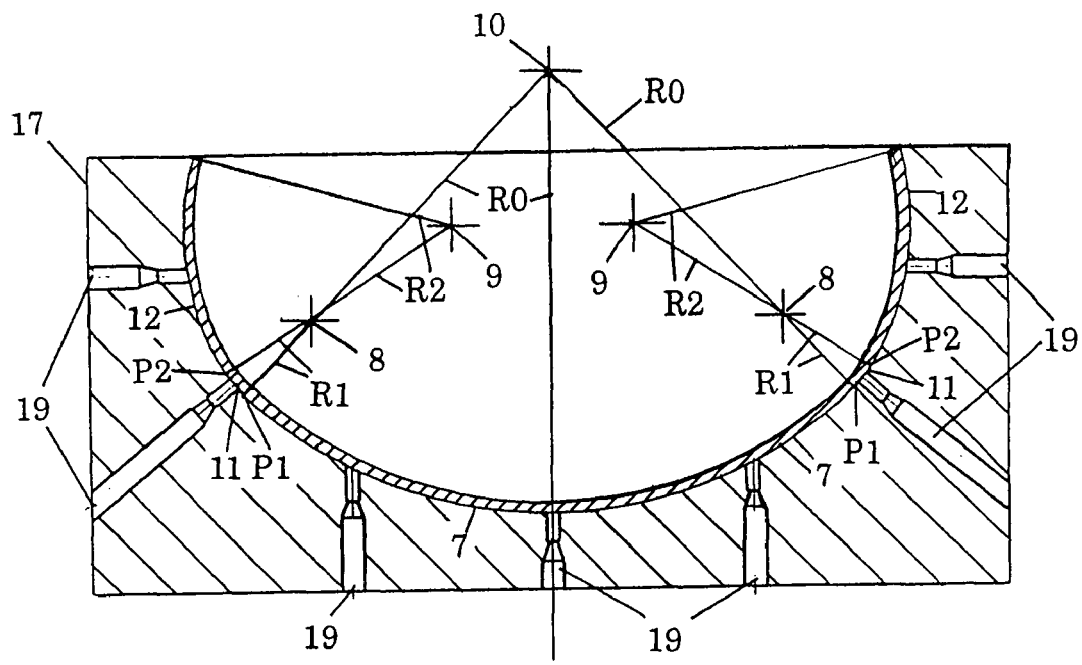
FIG. 7 is a sectional view of a mold 17 when ends of the polarizing lens object 2 for sunglasses for two eyes are subjected to a curving process after it was subjected to the spherical surface shaping process.

In the subsequent last shaping process, a polarizing lens object 2 for sunglasses in the state of the spherical surface shaping process is subjected to a curving process at the side of the eyes. That is, when the polarizing lens object 2 for sunglasses in the state of the spherical surface shaping process is subjected to the curving process at the side of the eyes, it is made up, as shown in FIG. 4, of a first rotating surface 11 extending from a first curved position P1 at the side of the eyes of the polarizing lens object 2 for sunglasses to a terminal end thereof, or it is made up, as shown in FIG. 7, of a first rotating surface 11 extending from a first curved position P1 at the side of the eyes of the polarizing lens object 2 for sunglasses to a second curved position P2 at the terminal end thereof, and further made up of a second rotating surface 12 extending from the second curved position P2 of the polarizing lens object 2 for sunglasses at the side of the eyes to the terminal end thereof.

Figure 4:
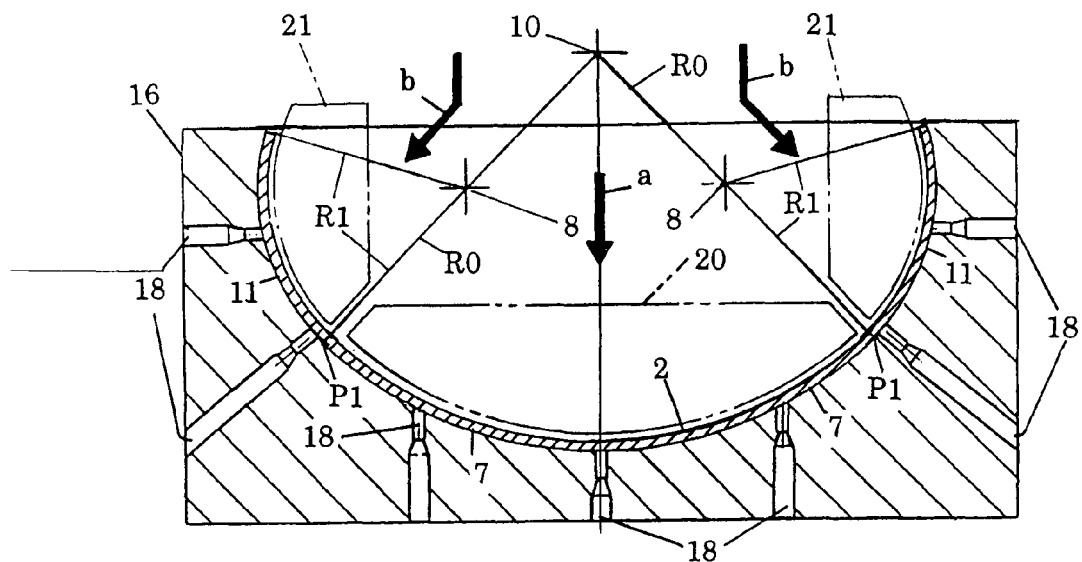
FIG. 4 is a sectional view of a mold 16 when ends of the polarizing lens object 2 for sunglasses for two eyes are subjected to a curving process after it was subjected to the spherical surface shaping process.

First, FIG. 4 shows a mold 16 in the case where a segment extending from the first curved position P1 at the side of the eyes of the polarizing lens object 2 for sunglasses to the terminal end thereof is made up of the first rotating surface 11. The first rotating surface 11 is formed of a part of a rotating surface obtained by rotating a vertical section of the spherical surface 7 at the first curved position P1 provided that a vertical rotating axis 8 passing through a radius line of the spherical radius R0 on a plane at the first curving position P1 and a radius R1 of a first rotating radius that is smaller than the spherical radius R0 are rotating conditions. In other words, the first rotating surface 11 is formed by causing a barrel-shaped rotating body, which is formed by rotating the vertical section of the spherical surface 7 at the first curved position P1 with the rotating radius R1, to inscribe in the first curved position P1, thereby forming the first rotating surface 11 by a part of the periphery of the barrel-shaped rotating body. Here, the first curved position P1 is not a fixed position, and can be optionally set depending on the shape of a frame. Meanwhile, since the radius R1 of the first rotating body is a distance extending from the vertical rotating axis 8 of the barrel-shaped rotating body to the spherical surface 7, the radius R1 of the first rotating body is large at the middle position and becomes small when it is displaced to the position above or below the middle position. The radius R1 of the first rotating body at the middle position is, e.g. 53 mm.

The first rotating surface 11 is formed, using a split type die, by placing the polarizing lens object 2 for sunglasses on an inner portion of the mold 16, and implementing vacuum suction through multiple suction holes 18 while heating the polarizing lens object 2 for sunglasses. That is, the first shaping process comprises pressing the polarizing lens object 2 for sunglasses against an inner surface of the mold 16 when subjecting the polarizing lens object 2 for sunglasses to the curving process to mold the polarizing lens object 2 for sunglasses in a predetermined shape by use of the split type die comprised of one center press die 20 that inscribes in the segment between the left and right first curved positions P1 and the side press dies 21 that inscribe in the segment between the first curved positions P1 of the polarizing lens object 2 for sunglasses to the terminal end thereof.

When using one center press die 20 and two side press dies 21 of the split type die, the center press die 20 is first lowered along the center line in the direction of the arrow a to press against the eyepiece plane side of the spherical surface 7, then two side press dies 21 are lowered at the position directed toward the center to be moved in the direction to press against the first rotating surfaces 11, namely, along the direction of the arrow b, thereby causing the side press dies 21 to press against the eyepiece plane side of the first rotating surfaces 11 corresponding thereto. In such a manner, when the split three dies, i.e. one center press die 20 and two side press dies 21, are moved with a time lag, even if the opening of the mold 16 is narrowed to be smaller than the shaping space, the center press die 20 and side press dies 21 effectively function while entering the narrow opening of the mold 16.

Figure 5:
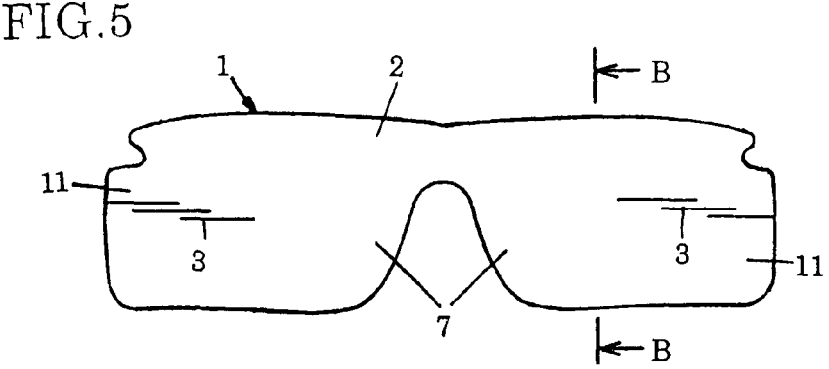
FIG. 5 is a front view of the polarizing lens 1 for sunglasses for two eyes.
Figure 6:
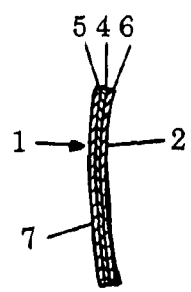
FIG. 6 is a sectional view of the polarizing lens 1 for sunglasses in FIG. 5 taken along arrows B-B in FIG. 5.

Upon completion of the foregoing shaping process, the first polarizing lens 1 for sunglasses as a product can be obtained as shown in FIGS. 5 and 6. The vertical section of the first polarizing lens 1 for sunglasses conforms to the spherical plane of the spherical surface 7 at any position. A horizontal section of the first polarizing lens 1 for sunglasses is made up of the spherical plane of one spherical surface 7 at the central portion, and also made up of spherical planes of two first rotating surfaces 11 at the left and side ends.

Next, FIG. 7 shows a configuration of a mold 17 when the polarization lens object 2 for sunglasses forms a first rotating surface 11 formed of a segment extending from a first curved position P1 at the side of the eyes of a polarizing lens object 2 for sunglasses to the terminal end thereof and a second rotating surface 12 formed of a segment between a second curved position P2 to the terminal end of the polarizing lens object 2 for sunglasses. The first rotating surface 11 is formed of a part of a rotating surface obtained by rotating a vertical section of a spherical surface 7 at the first curved position P1 provided that a vertical rotating axis 8 passing through a radius line of a spherical radius R0 on a plane at the first curved position P1 and a radius R1 of a first rotating body that is smaller than the spherical radius R0 are rotating conditions. Further, a second rotating surface 12 is formed of a part of a rotating surface obtained by rotating a vertical section of the first rotating surface 11 at the second curved position P2 provided that a vertical rotating axis 9 passing through an extension line of a radius line of the radius R1 of the first rotating body on a plane at the second curved position P2 and a radius of a second rotating body R2 that is larger than the radius R1 of a first rotating body but smaller than the spherical radius R0 are rotating conditions.

The first rotating surface 11 is formed by causing a barrel-shaped rotating body, which is formed by rotating the vertical section of the spherical surface 7 at the first curved position P1 with the rotating radius R1, to inscribe in the first curved position P1, thereby forming the first rotating surface 11 by a part of the periphery of the barrel-shaped rotating body. Likewise, the second rotating surface 12 is formed by causing a barrel-shaped rotating body, which is formed by rotating the vertical section of the first rotating surface 11 at the second curved position P2 with the rotating radius R2, to inscribe in the second curved position P2, thereby forming the second rotating surface 12 by a part of the periphery of the barrel-shaped rotating body.

The first rotating surface 11 is considered as a kind of transition curved surface for smoothly connecting between the spherical surface 7 and second rotating surface 12 when the second rotating surface 12 is strongly curved in the direction of the center 10 of the sphere. Both the first curved position P1 and second curved position P2 are not fixed positions, and can be optionally set depending on the shape of a frame. Since the radius R1 of the first rotating body and radius R2 of the second rotating body are distances from the vertical rotating axes 8, 9 of the barrel-shaped rotating body to the spherical surface 7, they are large at the middle positions of the vertical rotating axes 8, 9 and become small as they are displaced to the positions above or below the middle positions. The spherical radius R0 is 88.3 mm, which is the same as set forth above, and the radius R1 of the first rotating body and radius R2 of the second rotating body are 25.0 mm, 53.0 mm at the middle positions, as an example.

The first rotating surface 11 and second rotating surface 12 are formed by placing the polarizing lens object 2 for sunglasses on the inner portion of the mold 17, and implementing vacuum suction through the suction holes 19 while heating the polarizing lens object 2 for sunglasses. The formation of the first rotating surface 11 and second rotating surface 12 at this point in time is implemented by use of one center press die 20 and two side press dies 21 serving as a split type die in the same manner as the mold 16 shown in FIG. 4. It is a matter of course that the center press die 20 corresponds to the eyepieces plane of the spherical surface 7, and the side press dies 21 correspond to the first rotating surface 11 and second rotating surface 12.

Although the second polarizing lens 1 for sunglasses as a final product is obtained by the processes set forth above, the vertical section of the second polarizing lens 1 for sunglasses become that of the spherical surface 7 at any position. The horizontal section of the polarizing lens 1 for sunglasses is made up of the spherical surface 7, first rotating surface 11 and second rotating surface 12. The polarizing lens 1 for sunglasses for two eyes is finally mounted on a frame to become the sunglasses.

The polarizing film 4, polycarbonate 5 for an object, and polycarbonate 6 for an eyepiece are subjected to the curving process in advance along the spherical surface 7, then they can be pasted together. In this case, the spherical surface shaping process (the process shown in FIG. 3) can be omitted, after the polarizing film 4, polycarbonate 5 for an object, and polycarbonate 6 for an eyepiece were pasted together.

Figure 8:
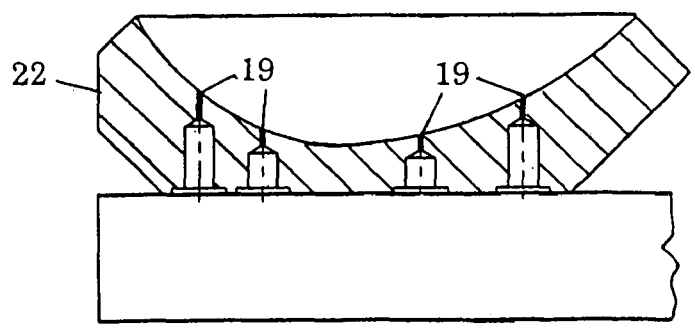
FIG. 8 is a sectional view when an end of the polarizing lens object 2 for sunglasses for one eye is subjected to a curving process after it was subjected to the spherical surface shaping process.

The shaping of the polarizing lens 1 for sunglasses for one eye is implemented by a split type die which is formed by dividing the mold 16 or 17 at the central position, as shown in FIGS. 4 and 7, and turning it upward. A mold 22 for shaping the polarization lens 1 for sunglasses for one eye shown in FIG. 8 is formed by dividing the mold 17 shown in FIG. 7 at the central position, and placing it upward as the mold for shaping the polarization lens 1 for sunglasses for the left eye side. The mold 22 for shaping the polarization lens 1 for sunglasses for the right eye side, not shown, is line-symmetric to the mold 22 shown in FIG. 8. Since the eyepiece plane is open when shaping the polarizing lens 1 for sunglasses for one eye, the split type die is not needed.

According to the polarizing lens 1 for sunglasses of the invention, it can be assembled as sunglasses having a degree by pasting a convex lens or a concave lens to the polarization lens 1 for sunglasses within the field of view or overlaying the concave or convex lens on the polarization lens 1 for sunglasses and combining them without the convex lens or concave lens to the polarization lens 1 for sunglasses.

What is claimed is:

1. A polarizing lens for sunglasses comprising a polarizing lens object formed by pasting a lens element for an object and a lens element for an eyepiece to an object plane and an eyepiece plane of a polarizing film having a polarizing axis oriented horizontally, respectively, said polarizing lens object having a spherical surface with a spherical radius and a portion extending from a first curved position of the polarizing lens object that corresponds to a peripheral portion of the eyes of a user to a terminal end of the polarizing lens object thereby forming a first rotating surface, said first rotating surface being formed of a part of a rotating surface obtained by rotating a vertical section of the spherical surface at the first curved position provided that a vertical rotating axis of said vertical section of the spherical surface passes through a radius line of a spherical radius on a plane at the first curved position as a first rotating condition and a radius of the first rotating surface is smaller than the spherical radius as a second rotating condition.

2. A polarizing lens for sunglasses comprising a polarizing lens object formed by pasting a lens element for an object and a lens element for an eyepiece to an object plane and an eyepiece plane of a polarizing film having a polarizing axis oriented horizontally, respectively, said polarizing lens object having a spherical surface with a spherical radius and a portion extending from a first curved position of the polarizing lens object that corresponds to a peripheral portion of the eyes of a user to a second curved position of the polarizing lens object thereby forming a first rotating surface, said first rotating surface being formed of a part of a rotating surface obtained by rotating a vertical section of the spherical surface at the first curved position provided that a vertical rotating axis of said vertical section of the spherical surface passes through a radius line of the spherical radius on a plane at the first curved position as a first rotating condition and a radius of the first rotating surface is smaller than the spherical radius as a second rotating condition, and a portion extending from the second curved position of the polarizing lens object to a terminal end thereof forming a second rotating surface, said second rotating surface being formed of a part of a rotating surface obtained by rotating a vertical section of the first rotating surface at the second curved position provided that a vertical rotating axis of the vertical section of the first rotating surface passes through an extension line of a radius line of the radius of the first rotating surface on a plane at the second curved position as a third rotating condition and a radius of the second rotating surface is larger than the radius of the first rotating surface but smaller than the spherical radius as a fourth rotating condition.

3. A method of shaping a polarizing lens for sunglasses as disclosed in claim 1, comprising the steps of: placing a flat plate-shaped polarizing lens object on an inner portion of a mold corresponding thereto, moving a center press die, that inscribes in a spherical surface of the polarizing lens object in a segment between left and right first curved positions, toward the inner portion of the mold while heating the polarizing lens object, causing the center press die to be put on an eyepiece plane side of the polarizing lens object and the polarizing lens object to be interposed between the inner surface of the mold and center press die and thereby form a spherical surface on the polarizing lens object for sunglasses; subsequently, moving two side press dies, that inscribes in left and right first rotating surfaces each extending from the first curved position to a terminal end of the polarizing lens object, toward the inner portion of the mold at the position directing toward the center of the mold, then moving two side press dies in a direction to press against eyepiece plane sides of the first rotating surfaces positioned at left and right sides of the mold, causing the polarizing lens object to be interposed between the mold and two side press dies so as to form the left and right first rotating surfaces on the polarizing lens object and thereby shape the polarizing lens.

4. A method of shaping a polarizing lens for sunglasses as disclosed in claim 2, comprising the steps of: placing a flat plate-shaped polarizing lens object on an inner portion of a mold corresponding thereto, moving a center press die, that inscribes in a spherical surface of the polarizing lens object in a segment between left and right first curved positions, toward the inner portion of the mold while heating the polarizing lens object causing the center press die to be put on an eyepiece plane side of the polarizing lens object and the polarizing lens object for sunglasses to be interposed between the inner surface of the mold and the center press die and thereby form a spherical surface on the polarizing lens object for sunglasses; subsequently moving two side press dies, that inscribe in left and right first and second rotating surfaces each extending from the first curved position to the terminal end of the polarizing lens object, toward the inner portion of the mold, at the position directing toward the center of the mold, then moving two side press dies in a direction to press against eyepiece plane sides of the first and second rotating surfaces positioned at left and right sides of the mold to cause the polarizing lens object for sunglasses to be interposed between the mold and two side press dies and thereby form the left and right first rotating surfaces on the polarizing lens object and shape the polarizing lens.

* * * * *